United States Patent

[11] 3,550,805

| [72] | Inventor | Michele Leonforte |
| | | 19 Juniper Road, Kings Park, N.Y. 11754 |
| [21] | Appl. No. | 827,320 |
| [22] | Filed | May 23, 1969 |
| [45] | Patented | Dec. 29, 1970 |

[54] CLOSURE HAVING INTEGRAL SPOON
4 Claims, 3 Drawing Figs.

[52] U.S. Cl. .................................................. 220/42
[51] Int. Cl. ................................................. B65d 41/00
[50] Field of Search ..................................... 220/42, 53, 54, 85; 215/(Digest)

[56] References Cited
UNITED STATES PATENTS
3,104,032  9/1963  Hansen ..................... 222/91
3,334,778  8/1967  Saunders .................... 220/54

Primary Examiner—George T. Hall
Attorney—Charles Marks

ABSTRACT: The bowl of a spoon and the handle thereof are removably embedded in apertures in a closure member which is removably engaged with the mouth of a cylindrical container. The spoon seals the closure member while engaged therewith but upon removal of the spoon from the closure member, the contents of the cylindrical container are permitted to be dispensed through the aperture previously occupied by the bowl and into said bowl from whence said contents may be dispensed by the user.

INVENTOR.
MICHELE LEONFORTE
BY
Charles Marks

3,550,805

CLOSURE HAVING INTEGRAL SPOON

BACKGROUND OF THE INVENTION

1. Field of the Invention

This invention relates to closure members employed on cans and other containers, and to means for dispensing the contents thereof.

2. Description of the Prior Art

Heretofore, it has been customary to furnish a variety of foods and other materials in cans which are permanently sealed by closure members, such as the ends of such cans, and which are intended for removal or opening in order to gain access to the contents of the cans. Such contents may then be dispensed by means of spoons, spatulas and other instruments which usually must be provided by the user and which require him to approximate the quantity of the materials dispensed by such instruments. This situation frequently entails permanent rupture of the container end, the consequent discard of unused portions of such substances when they are perishable or not readily stored after such destruction of the container end, and interferes with accurate and economical dispensation of the contents of the container. Moreover, the user may not have readily accessible means for dispensing the said contents in a convenient manner.

The present invention solves these problems.

SUMMARY OF THE INVENTION

In the present invention, a closure member is removably and yieldably conformable to the mouth of a container. The face of the closure member includes an aperture which accommodates the cylindrical bowl of a spoon, the handle of the spoon also being removably received within an aperture in the face of the closure member. The cylindrical bowl of the spoon is removable from its aperture thereby exposing the interior of the container and permitting removal of its contents through the aperture and into the said cylindrical bowl which is adapted to receive a predetermined quantity of said contents and to dispense the same as desired by the user. The contents of the container are sealed by said spoon from the outside atmosphere when the spoon is engaged with the closure member and such contents may be resealed, as desired, by reassembly of the spoon with the closure member. The closure member itself is also removable from the container so as to afford greater access thereto when desired.

Thus, it is an object of the present invention to provide an improved closure member for containers which closure member incorporates improved means for dispensing the contents thereof.

Another object of the present invention is to provide a removable closure member for containers which closure member incorporates removable means for dispensing the contents thereof.

A further object of the invention is to provide such dispensing means which may be easily reassembled with such closure member so as to effect the sealing of the container used therewith.

A still further object of the invention is to provide dispensing means of the character described which are adapted to dispensing predetermined, accurate quantities of substances disposed within such containers.

Yet a further object of the invention is to provide a closure member and dispensing means of the character described which are susceptible to easy and economical manufacture and which are of simple and sturdy design.

Other objects and advantages of the present invention will become apparent from the following discussion when read in conjunction with the accompanying drawing.

BRIEF DESCRIPTION OF THE DRAWING

In the drawing.

Throughout the several views, similar numerals are employed to refer to similar parts of the invention.

DESCRIPTION OF THE PREFERRED EMBODIMENT

Figure 1:
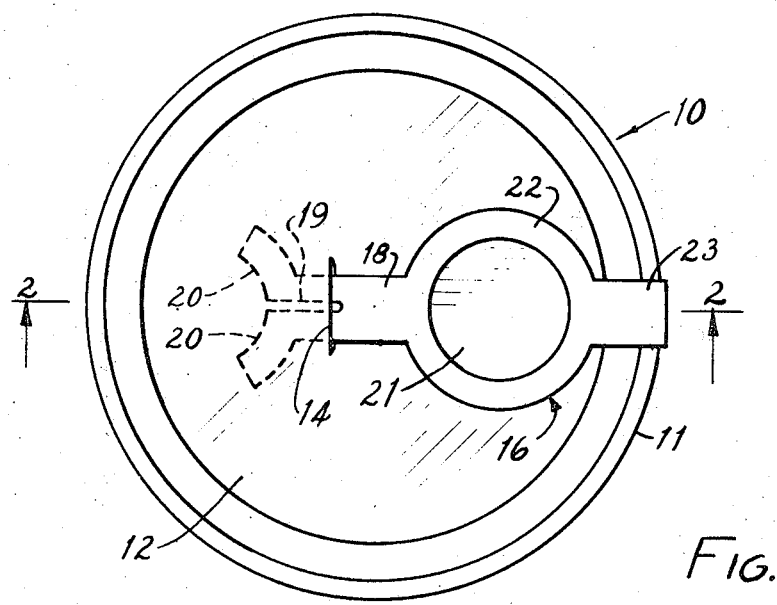
FIG. 1 is a plan view of the preferred embodiment of the invention.
Figure 2:
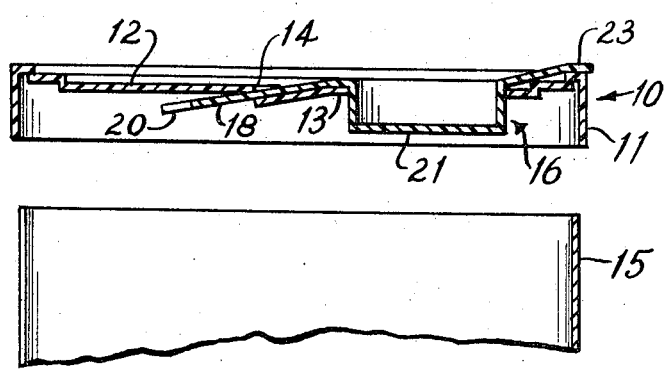
FIG. 2 is a cross-sectional view taken about the line 2-2 of FIG. 1 and depicting a fragmentary cross-sectional view of a container with which the closure member of the present invention may be employed.
Figure 3:
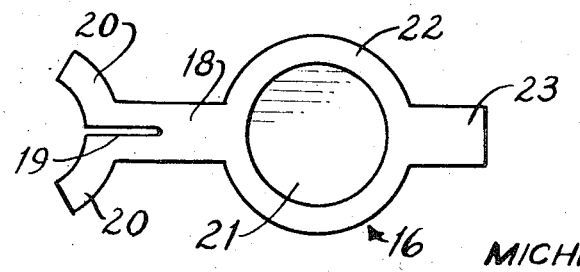
FIG. 3 is a plan view of the dispensing means employed in said embodiment of the invention.

As shown in FIGS. 1 and 2 of the accompanying drawing, the preferred embodiment of the present invention comprises a closure member, generally designated by the numeral 10 and including an inverted cup-shaped element 11 having a hollow, cylindrical conformation and an end face 12 disposed transversely of the longitudinal axis of the cup-shaped element 11.

Said cup-shaped element 11 and end face 12 are preferably composed of a yieldable, transparent plastic material. It is to be understood, however, that other materials having similar characteristics may also be employed.

As may be seen in FIG. 2, a circular aperture 13 is formed in the end face 12, which is also provided with a slot 14 disposed in spaced relation with respect to said aperture 13.

The cup-shaped element 11 yieldably engageable with a cylindrical container 15 of conventional design, adapted to receive granular coffee, food or other substances.

A spoon, generally designated by the numeral 16, includes a handle 18 removably receivable in the slot 11, said handle 11 being provided with a longitudinal notch 19 disposed centrally of a pair of yieldable bifurcations 20. The spoon 16 is preferably composed of a flexible plastic material or other substance of similar characteristics.

The spoon 16 also includes a cylindrical bowl 21 which is removably engageable with the aperture 13 in the end face 12. Said cylindrical bowl 21 is of a predetermined depth, thereby adapting it to receive a predetermined quantity of the contents of the container 15. The bowl 21 is provided with a generally annular flange 22 which has an extension or tab 23.

The spoon 16 is employed to complete the seal of the end face 12 when said spoon 16 is disposed in the position depicted in FIGS. 1 and 2, wherein the handle 18 is accommodated within the slot 14 and the cylindrical bowl 21 is accommodated within the aperture 13.

When desired, the spoon 16 is removable by means of the tab 23 which projects laterally of the cup-shaped element 11 and is manually engageable so as to permit the bowl 21 to be pulled out of the aperture 13 and the handle 18 to be pulled out of the slot 14. Upon such removal, the contents of the container 15 may be dispensed through the aperture 13 and into said bowl 21 for subsequent dispensation therefrom or the cup-shaped element 11 may be removed from the container 15 so as to permit the bowl 21 to be inserted within the container 15 for purposes of removal of the contents thereof in the conventional manner.

The cup-shaped element 11 and spoon 16 may be reassembled in the above-described position and replaced upon the container 15, thereby re-sealing the same.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. A closure member engageable with a container, comprising in combination:
   a. a hollow, cup-shaped element provided with an end face;
   b. a spoon including;
      i. a handle;
      ii. a bowl;
   c. said end face including:

i. an aperture;
ii. a slot in spaced relation with respect to said aperture;
d. said handle being removably received within said slot; and
e. said bowl being removably engaged with said aperture.

2. A device according to claim 1, said handle including a pair of yieldable bifurcations and a notch disposed centrally of said yieldable bifurcations.

3. A device according to claim 1;
a. said aperture being circular; and
b. said bowl being cylindrical and provided with a generally annular flange having a tab projecting laterally of the hollow, cup-shaped element.

4. A device according to claim 1;
a. said hollow, cup-shaped member being composed of a yieldable, transparent plastic material;
b. said spoon being composed of a flexible plastic material.